United States Patent
Andersson et al.

(10) Patent No.: US 6,836,719 B2
(45) Date of Patent: Dec. 28, 2004

(54) METHOD AND SYSTEM FOR CONTROLLING A VEHICLE

(75) Inventors: Hans Andersson, Molndal (SE); Martin Apelryd, Gothenburg (SE)

(73) Assignee: Ford Motor Company, Dearborn, MI (US)

(*) Notice: Subject to any disclaimer, the term of this patent is extended or adjusted under 35 U.S.C. 154(b) by 51 days.

(21) Appl. No.: 10/271,000

(22) Filed: Oct. 15, 2002

(65) Prior Publication Data

US 2003/0093209 A1 May 15, 2003

(30) Foreign Application Priority Data

Oct. 15, 2001 (EP) ............................................. 01124581

(51) Int. Cl.⁷ ................................................ B60T 8/58
(52) U.S. Cl. ........................... 701/93; 701/98; 180/179; 123/352
(58) Field of Search ............................... 701/93, 96, 98, 701/207, 208; 180/170, 176, 179; 123/352

(56) References Cited

U.S. PATENT DOCUMENTS

| 5,594,645 A | * | 1/1997 | Nishimura et al. ........... 701/96 |
| 5,611,753 A | * | 3/1997 | Kondo et al. ................ 477/118 |
| 5,684,699 A | | 11/1997 | Sugiyama |
| 5,954,617 A | * | 9/1999 | Horgan et al. .............. 477/107 |
| 6,076,034 A | | 6/2000 | Satoh et al. |
| 6,161,071 A | * | 12/2000 | Shuman et al. ............... 701/48 |
| 6,161,072 A | | 12/2000 | Clapper |
| 6,188,945 B1 | | 2/2001 | Graf et al. |
| 6,330,553 B1 | * | 12/2001 | Uchikawa et al. ............. 706/2 |
| 2002/0173881 A1 | * | 11/2002 | Lash et al. ..................... 701/1 |
| 2003/0093210 A1 | * | 5/2003 | Kondo et al. ................. 701/96 |

FOREIGN PATENT DOCUMENTS

| DE | 19711819 A1 | 10/1997 |
| EP | 0989012 A2 | 3/2000 |
| JP | 2000104583 | 4/2000 |
| WO | WO 0115927 A1 | 3/2001 |

* cited by examiner

*Primary Examiner*—Gary Chin
(74) *Attorney, Agent, or Firm*—Dykema Gossett PLLC; Carlos L. Hanze

(57) ABSTRACT

A method and system for controlling a vehicle includes receiving vehicle position information from a positioning system and combining the position information with information from a map database and a driver behavior model to control the vehicle's speed and braking for not only the current roadway the vehicle is operating on but also on upcoming road sections.

5 Claims, 2 Drawing Sheets

METHOD AND SYSTEM FOR CONTROLLING A VEHICLE

TECHNICAL FIELD OF THE INVENTION

The present invention relates to a method for controlling a vehicle, said vehicle having a system being connected with a position input connection for receiving vehicle position information from a positioning system, a map database, a driver information database, and an output connection.

The invention also relates to a system comprising the above stated components and a vehicle.

BACKGROUND OF THE INVENTION

Within the vehicle industry, many systems are currently being developed for assisting a driver to keep an appropriate vehicle speed. The most straightforward systems are the cruise control systems, keeping a vehicle at a pre-set speed, unless the driver overrides the system by, for example, engaging the brake. However, in certain situations, such as sharp curves or intersections, the driver might want to have a somewhat lower speed than said pre-set speed in order to comfortably and safely pass the obstacle. A problem however is that most cruise control systems are suspended when a driver presses the brake, wherefore the system needs to be reactivated after passing the obstacle in order to continue driving at said pre-set speed. Consequently, the systems have to be continuously monitored and set by the driver.

Some efforts have thereby been put into system which automatically adapt the speed of the vehicle based on national speed limits. However, vehicle drivers all have individual speed control behaviours, based on their own preferences and driving conditions and these are seldom at the same speed as the speed limits. All of the above mentioned drawbacks with prior art systems have resulted in a rather low user acceptance for the prior-art speed control systems.

Consequently, the object of the present invention is to provide a method and a system for cruise controlling a vehicle, providing a flexible solution overcoming the above mentioned drawbacks with the prior-art systems.

These and other objects are achieved by a method as stated by way of introduction, with the method comprising the following steps: receiving vehicle position information via a position input connection, extracting, from a map database, map information relating to at least one of a current and an upcoming road section, based on the vehicle position information, extracting, from a driver information database, information regarding previous driver behavior for at least one of a current road section and a similar road section, generating, based on information from an input connection, the map database and the driver information database, a speed plan for at least one of the current and upcoming road section, and outputting, via the output connection, a speed plan. By such a method it is possible to generate a speed plan, which may be used to adapt the speed of the vehicle for a chosen road section in a suitable manner. The speed plan may be used to manually or autonomously control the vehicle. By generating a speed plan for a current and/or upcoming road section, based on map data as well as user preferences as stored in the driver information database, the vehicle may driven in a comfortable and safe way as experienced by the driver.

Preferably, the method further comprises the step of: generating a driver behavior model, based on information from the input connection, the map database and the driver information database, whereby the speed plan is generated from the driver behavior model.

Preferably, the method comprises the steps of: extracting, from the map data base, one or more road attributes for the current and/or upcoming road section, and relating the road attributes to the driver behavior model. By doing this, the size of the map database may be made smaller, since only said attributes need to be stored.

In accordance with a preferred embodiment, the step of generating a driver behavior model comprises the step of: deriving the model by relating one or more road section attributes, extracted from said map database, to driver speed behavior, by using a neural network device. This makes it possible to predict speed plans for roads never driven before, by relating it to other road sections having similar road attributes, as stored in the map database.

The method further comprises the step of inputting, to said driver information database, a driver identification signal from a driver identification module, said signal being used to provide an individual driver information database for each user of the vehicle. Thereby, it is possible to adapt the generated to speed plan to the current driver of the vehicle.

In accordance with a preferred embodiment, the method comprises the step of feeding said outputted speed plan to a throttle control device, for controlling the throttle of a vehicle based on said speed plan. As an alternative or complement, the method may comprise the step of feeding said outputted speed plan to a brake system control device, for controlling the brake system of the vehicle based on the speed plan. Thereby, the vehicle may be autonomously controlled, taking under consideration personal driver style and road characteristics. As a further alternative or complement, the method may comprise the step of feeding said outputted speed plan to a driver display unit, for at least one of displaying the speed plan for the driver, and informing the driver of suitable speed adaptations based on the speed plan.

Furthermore, according to yet another embodiment of the invention, the method may also comprise the steps of extracting, from a plurality of sensors, sensor information regarding obstacles on or in vicinity of said road section, and generating, based on information from the input connection, the map database, the driver information database, and the sensor information, a speed plan for the current and/or upcoming road section. Thereby, temporary circumstances, or objects not present in the map database, may be taken under consideration when generating the speed plan.

The objects as stated above are also achieved by a system for controlling a vehicle, said vehicle having a cruise control system comprising a position input connection, for receiving vehicle position information from a positioning system, a map database, comprising information regarding at least one of a current and an upcoming road section, based on the vehicle position information, a driver information database, comprising information regarding previous driver behavior for at least one of said current and a similar road section, a speed plan generator, for generating a speed plan for at least one of a current and an upcoming road section, based on information from the input connection, the map database and the driver information database, and an output connection, for outputting the speed plan. By using such a system, it is possible to generate a speed plan, which may be used to adapt the speed of the vehicle for a chosen road section in a desired manner. The speed plan may be used to manually or autonomously control the vehicle. By generating a speed plan for a current and/or upcoming road section, based on map data as well as user preferences as stored in the driver information database, the vehicle may driven in a comfortable and safe way as experienced by the driver.

Furthermore, the system preferably comprising a computing device for generating a driver behavior model, based on information from the input connection, the map database and the driver information database, whereby the speed plan is generated from said driver behavior model. Moreover, said computing device is suitably realized by means of a neural network. This makes it possible to predict speed plans for roads never driven before, by relating it to other road sections having similar road attributes, as stored in the map database.

Finally, the speed plan is outputted to at least one of a throttle control device, a brake system control device and a driver display unit, for enabling autonomous and/or manual control of said vehicle, based on said speed plan.

BRIEF DESCRIPTION OF THE DRAWINGS

A currently preferred embodiment of the present invention will now be described in closer detail, with reference to the accompanying drawings.

DETAILED DESCRIPTION OF PREFERRED EMBODIMENTS OF THE INVENTION

Figure 1:
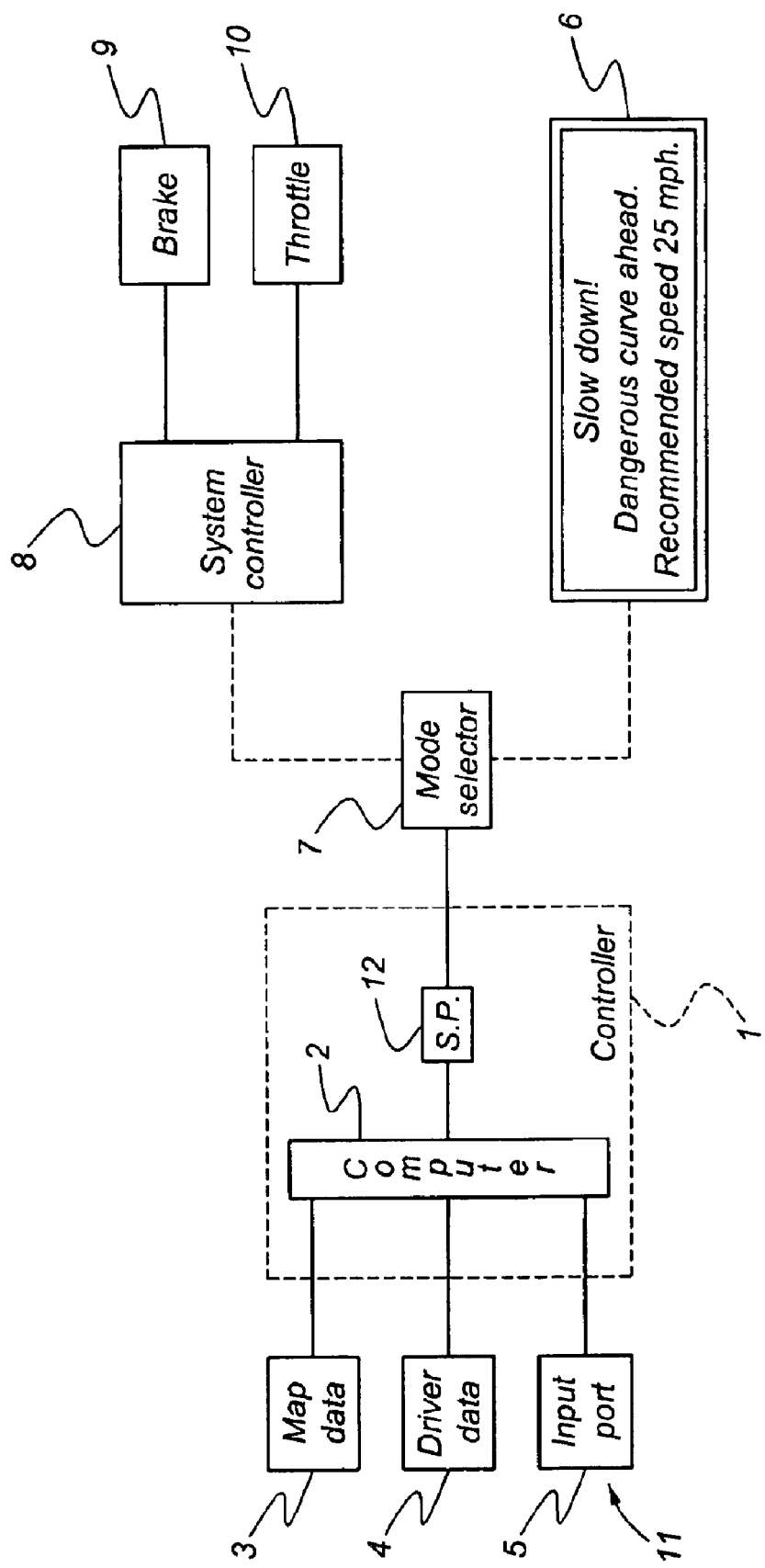
FIG. 1 is a block diagram of one preferred embodiment of the invention.

A system in accordance with a first embodiment of the invention is shown in FIG. 1. The system comprises a cruise control unit 1, including a computing device 2. Furthermore, a map database 3, a driver information database 4 and an input connection 5 for receiving a positioning signal 11 such as a GPS signal, is connected with cruise control unit 1. Information from the map database 3, the driver information database 4, and the positioning signal 11 are arranged to be inputted to computing device 2.

In the driver information database, information regarding previous driving characteristics for the vehicle are stored, such as vehicle speed through curves, retardation distances when the vehicle is to come to a full and complete stop and so on. Furthermore. pre-set characteristics, such as a pre-defined preferred driver style, may be stored in the driver information database.

Furthermore, the computing device is arranged to generate and output a driver behavior model, relating data from the map database 2 and driver information database 4 with the position of the vehicle as detected by means of positioning signal 11, as will described below. The driver behavior model is thereafter inputted to a speed plan generator 12, arranged to generate a vehicle speed plan for a current and up-coming road section.

The speed plan, containing information regarding preferred vehicle speed, accelerations and retardations for an up-coming road section, is thereafter inputted to a mode selector 7, whereby a user/driver may choose between a manual drive mode, in which speed alteration recommendations are displayed on a display unit 6, visible for the driver, and an autonomous control mode, in which the speed plan is inputted to a vehicle system control device 8, e.g. being connected wit a brake control unit 9 and/or an engine control unit such as a throttle control unit 10, for autonomous vehicle speed control in accordance with the speed plan. It is also possible to combine the two modes, e.g. using autonomous control mode, and displaying speed changes on the display unit 6, in order to inform the driver of up-coming speed changes.

The function of the system described above is as follows.

A user drives the vehicle over a road section. A geographical positioning signal 11, such as a GPS signal, locating the vehicle, is picked up and inputted through the input connection 5 to the cruise control unit 1. Thereafter map data from said map database 3, relating to the current and/or an up-coming road section, based on said positioning signal 11, is loaded into the cruise control unit 1. Furthermore, information is downloaded from said driver information database 4, said information being related to the current and/or an up-coming road section, based on said positioning signal 11. Consequently, positioning information, map information, and previous speed behavior on to current road section are loaded into said computing means 2. From this information, a driver behavior model is built up, taking under consideration location and previous driving behavior at that specific location as well as the surroundings, as described by the map database 3.

When said driver behavior model has been generated, it is inputted to a speed plan generator 12, in which a speed plan is generated. The speed plan comprises information regarding appropriate changes of the vehicle speed in order to respond to said driver behavior model.

The speed plan is thereafter transmitted to the manual/automatic mode selector 7, as described above, and the signal is thereafter transmitted to the vehicle system control device 8 for autonomous speed adaptation and/or the display unit 6, far displaying appropriate speed alterations to the driver of the vehicle.

A more advanced set speed proposal, and user defined speed control functionality, further associates the speed values stored in the driver information database 4 with attributes of the road section, such as speed limit, number of lanes and road surface. The values of these attributes for a road section are stored in said map database. Examples of such attributes may for example be physical attributes such as road yaw rate, road surface, road bumps or curvature, but also other attributes such as speed regulations and so on. This information may be inputted to said computing device 2, for generating the driver behavior model with respect to said road section attributes.

In accordance with a second embodiment of the invention, the computing device 2, as shown in FIG. 1, comprises a neural network unit. By using a neural network for relating different road section attributes (from the map database) to a driver speed behavior as stored in the driver information database 4, the driver behavior model may be derived. The use of a neural network further enables the driver behavior model to be used for predicting a drivers intended speed on a road section never driven before. This is done by studying a chosen set of road section attributes, as described above, such as curvature, road surface and so on, and studying driver behavior at previously driven road sections showing similar attributes, as stored in the driver information database 4.

The driver may at all times override the current speed plan by pushing the accelerating or brake pedal. All such changes arc feed back to the driver information database, for use when generating a speed plan next time the vehicle is driven on the same or a similar road section.

As described above, the system may be set in two different modes, an autonomous speed adaptation mode, in which the speed of the vehicle is automatically controlled, and a driver information mode, in which the driver is informed of suitable speed adaptations.

If the driver has chosen the driver information mode, in which he controls the speed of the vehicle manually, indications of suitable speed adaptations, based on levels previously chosen for the same road section is displayed to the driver. In case the current vehicle speed is too high, compared with previously chosen speeds for the same road section, a warning may be addressed to the driver. This may also be the case if the driver fails to respond to the displayed speed adaptations within a pry-set time limit or distance to an obstacle.

Furthermore, when the vehicle is running in autonomous speed control mode, the speed plan is effectuated by actuator systems of the vehicle, as described above, and furthermore an indication of a speed limit condition and vehicle control actions may be displayed to the driver on said display unit 6 in order to create an driver understanding of the automatic speed controlling actions.

When the above-described system is used together with an adaptive cruise control (ACC) or ordinary cruise control (CC) system, the user-defined speed for the road section ahead can be used as a suggested level for the set speed.

Figure 2:
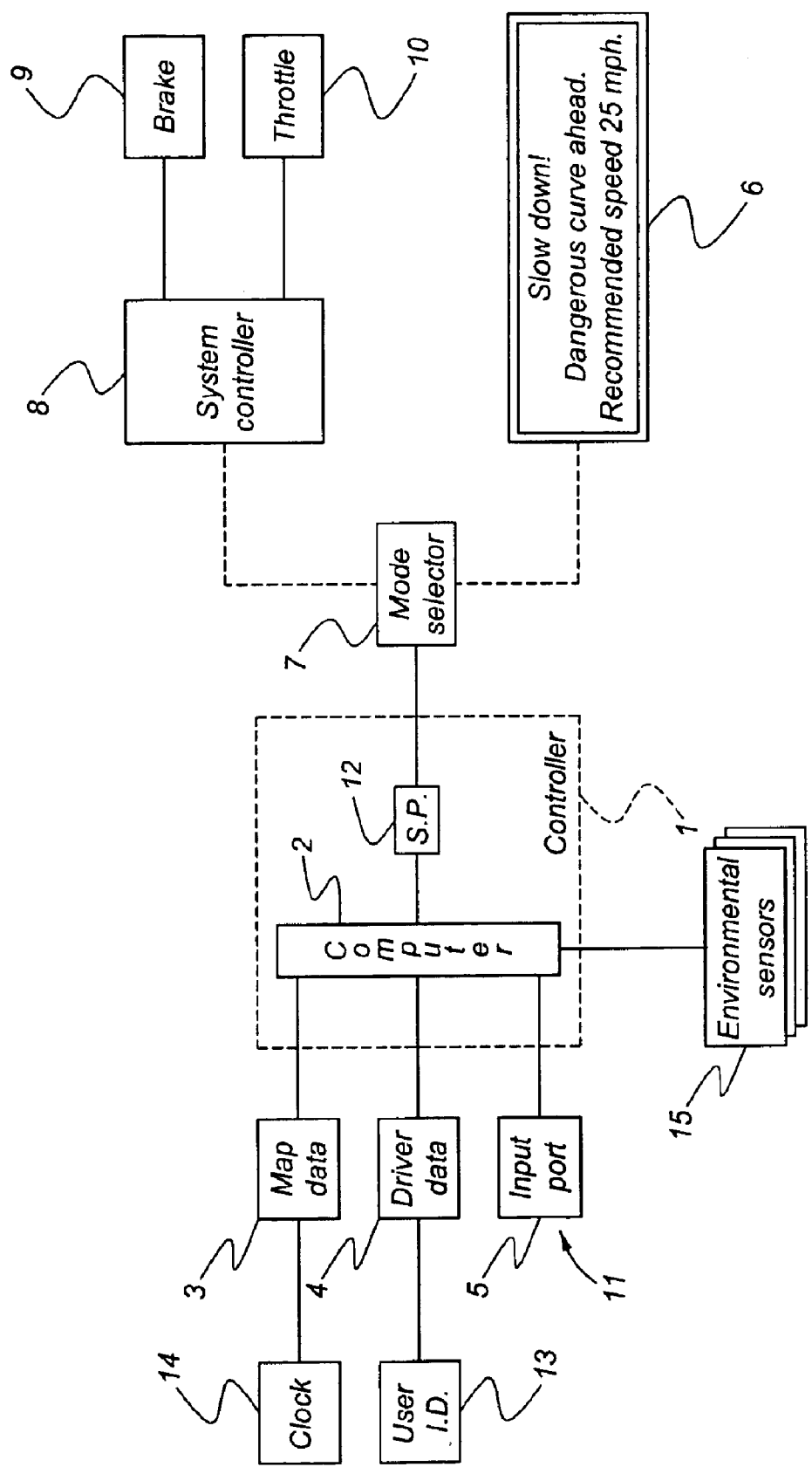
FIG. 2 is a further block diagram disclosing certain preferred additional functions of the block diagram in accordance with FIG. 1.

Furthermore, the above system may be combined with a user-identification module 13, as shown in FIG. 2, in order to generate user specific individual driver models. The user-identification information is preferably transmitted to the driver information database 4, comprising several storing areas for storing driver information regarding different drivers. This enables the generation of a speed plan, for example taking consideration to what speed a certain driver prefers when entering a curve, considering factors such as curve radius, speed limits, lane width, pavement and so on, said factors being extractable from the map database 3 and the specific individual storing area of the driver information database 4.

Also, a clock circuit 14 may be connected with said map database, as shown in FIG. 2. Thereby, it is possible to further adjust the speed plan by considering factors such as degraded night vision, or time controlled speed limits on the road ahead.

Furthermore, factors not directly related to the upcoming road section, but rather to a driver-vehicle environmental combination, may be considered by including the input of one or more sensors, indicated with the reference number 15 in FIG. 2, when creating the driver model. Examples of such factors may be light conditions, visibility and road friction, detected by for example radar sensors, IR sensors or a camera. The predicted user defined speed plan may thereafter be used for setting comfort speeds for an autonomous speed control as well as warning distances, taking into consideration objects and conditions that are not always present, and thereby not included in said map database 3.

Furthermore, since road section attributes, such as described above, temporarily may be changed the system may also include a temporary change unit, for storing temporary changes, changes that are in effect regularly within certain hours of the day etc. This temporary change unit may also be an integrated part of the map database.

Other information may also be included when generating the speed plan. Examples of such information arc vehicle fuel efficiency, stability and longitudinal slopes on said road section.

Consequently, a driver behavior model may be derived, based on the identification of one or more road attributes, having a significant impact on the driver speed behavior. The attributes for a current and/or an upcoming road section may be derived from a map database within said vehicle, and may be related to the driver behavior model. Thereby, a speed plan for the vehicle may be generated, by which it is possible to autonomously control vehicle speed and/or warn/inform the driver of suitable speed adaptations. Preferably, the driver behavior model may be generated by using a neural network, although other means are possible. By using a neural network for relating different road section attributes, as extracted from the map database, to the drivers speed behavior, as extracted from the driver information database, the speed plan generator may be extended to predict and generate speed plans for road sections never driven before, by studying particular attributes for that road section.

The present invention should not be considered as being limited to the above-described embodiment, but rather includes all possible variations covered by the scope defined by the appended claims.

For example, many different combinations of the above-described features are possible, since most of tern, such as the use of a neural network and the inclusion of sensor information, are independent from each other. Furthermore, it is possible to regularly update the on-board map database, by means of a GSM connection or other means of information transfer.

Furthermore, it may be possible to connect a system as stated above with a route planner. By knowing the intended route, a speed plan for the entire route may be calculated in advance, thereby estimating mean speed, travel time, fuel consumption and so on.

Also, the position input connection 5 need not necessarily be from an off-board source of position data. For example, a "dead reckoning" system, whereby on-board sensors such as (for example) a compass, steering angle sensor, yaw sensor and/or wheel speed sensors sense the movement of the vehicle from a known or estimated beginning position, can be the system which provides position data via position input connection 5.

What is claimed is:

1. A method for controlling a vehicle comprising:
   receiving an approximate vehicle position from a positioning system;
   retrieving a plurality of map information comprising at least road attributes, from a map database, said plurality of map information being related to said approximate vehicle position;
   retrieving a plurality of driver behavior information from a driver behavior database, said plurality of driver behavior information being related to said plurality of map information;
   generating a driver behavior model by relating said plurality of road attributes to said plurality of driver behavior information by using a neural network device;
   generating a speed plan based on said plurality of map information and said driver behavior model;
   outputting said speed plan to a vehicle control module comprising an engine control device and a brake system control device; and
   using said engine control device and said brake system control device to control the speed of the vehicle autonomously on said speed plan.

2. The method of claim 1, further comprising a step of inputting to said driver behavior database a driver identification signal, wherein said retrieved plurality of driver behavior information is related to said driver identification signal.

3. The method of claim 1, wherein said vehicle control module comprises a driver display unit, wherein said driver display unit presents to a driver of said vehicle at least one instruction related to said speed plan.

4. A system for controlling a vehicle comprising:
- a positioning device, said positioning device being capable of determining an approximate position of said vehicle;
- a map database, said map database being capable of determining a plurality of map information, said plurality of map information being related to said approximate position of said vehicle;
- a driver behavior database, said driver behavior database being capable of determining a plurality of driver behavior information, said plurality of driver behavior information being related to said plurality of map information;
- a driver behavior model determined by a neural network device which relates said plurality of map information with said plurality of driver behavior information;
- a computing device, said computing device being capable of generating a speed plan based on said plurality of map information and said driver behavior model; and
- a vehicle control module, comprising a speed control device and a brake system control device, for controlling said vehicle autonomously based on said speed plan.

5. The system of claim 4, wherein said vehicle control module comprises a driver display unit.

* * * * *